Nov. 22, 1949  J. O. ANDREE ET AL  2,488,653
PORTABLE HAY DEHYDRATOR
Filed March 28, 1946  2 Sheets-Sheet 1

Fig. 1.

JOHN O. ANDREE
CHARLES V. PETERSON
INVENTOR.

BY
ATTORNEY

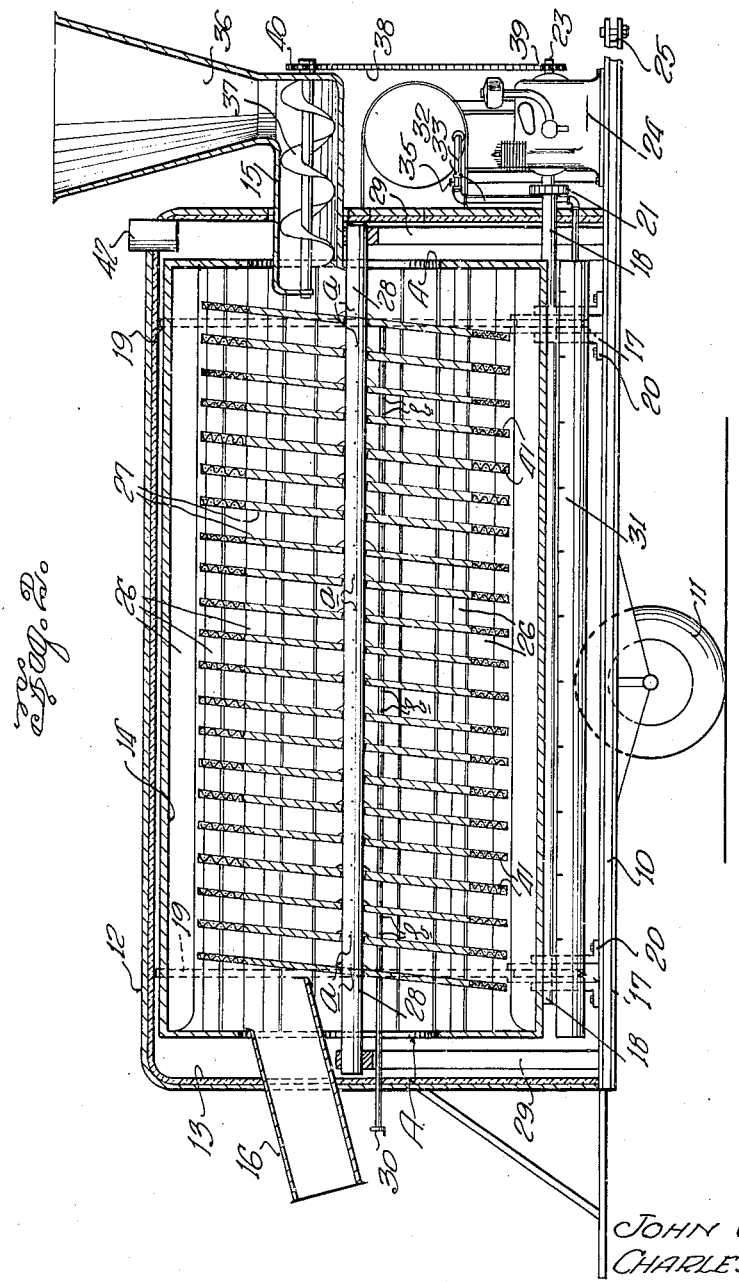

Patented Nov. 22, 1949

2,488,653

UNITED STATES PATENT OFFICE 2,488,653

PORTABLE HAY DEHYDRATOR

John O. Andree, Fort Worth, and Charles V. Peterson, Nocona, Tex.

Application March 28, 1946, Serial No. 657,652

3 Claims. (Cl. 263—34)

This invention relates to dehydrating apparatus and more particularly to portable hay dehydrating machines.

The principal object of the invention is to prepare field hay for consumption as stock feed at the time it is harvested by subjecting the freshly cut hay to the drying action of preheated air. This operation is accomplished as the wheeled dehydrating unit is drawn through the field behind a conventional mower and, in so doing, the usual drying period by natural processes is obviated and the laborious operations of stacking and subsequently removing the hay to storage are obviated.

Another object of the invention is to provide an improved, portable hay dehydrator consisting of a wheeled housing in which is mounted a drum whose external diameter is but slightly less than the inner diameter of the housing and is of substantially the same length thereof. The drum has closely spaced, longitudinal fins or vanes on its inner surface. These fins or vanes serve to elevate and deposit material onto the inclined surfaces of a plurality of circular, closely spaced and air pervious baffles or shutters occupying the space within the drum from end to end and by which material is caused to advance slowly from the inlet to the outlet of the drum as it is subjected to the action of air maintained at relatively high temperatures by a burner located below the drum.

With the foregoing and other objects in view, the invention has further reference to certain features of accomplishment, to become apparent as the description proceeds, taken in connection with the accompanying drawings wherein:

Figure 1 is an end elevational view of a hay dehydrating machine embodying the invention, partly broken away to illustrate internal parts, and Figure 2 is a side view of the machine, shown in vertical section, taken on line 2—2 on Figure 1.

Continuing with a more detailed description of the drawings, reference numeral 10 denotes a chassis or frame supported on wheels 11. Mounted on this frame is a sheet metal housing 12 having a lining 13 of suitable insulating material. It is preferred that the upper portion of the housing be of substantially cylindrical form, as shown, in order that a drum 14, mounted in the housing will conform thereto. Further reference to this drum will be made presently.

The housing 12 is closed except for a material inlet barrel 15 and an outlet chute 16, through which dried hay is discharged into a trailer (not shown) drawn behind the dehydrator. The inlet and outlet will be more particularly described later.

Referring again to the drum 14, it will be observed that a pair of grooved rollers 17 is mounted on each of two parallel shafts 18 coextensive with the drum. The rollers are so disposed on the shafts 18 as to receive annular flanges 19 surrounding the drum adjacent each end thereof. The shafts 18 are supported in bearings mounted in standards 20, the latter, in turn, being mounted on the floor of the housing 12. The forward ends of the shafts 18 extend beyond the front wall of the body and carry sprockets 21, operated by chains 22, the latter being driven from a sprocket (not shown) mounted on the drive shaft 23 of a motor 24. The motor 24 is mounted on the front extension of the frame 10 which latter is equipped with a hitch 25 by which the body is drawn by a draft implement, not shown.

It is apparent from the foregoing that when the motor 24 is in operation, shafts 18 will be rotated to rotate drum 14 through the medium of rollers 17 on which the drum is supported.

Affixed to the inner surface of the drum are longitudinally disposed, relatively spaced fins or vanes 26. These fins extend the full length of the drum and the purpose thereof is to elevate material from the bottom of the drum and deposit the same onto the inclined faces of a plurality of relatively spaced, circular baffles 27. The obvious result of the foregoing action will be the progressive movement of material towards the rear or discharge end of the drum 14 since the baffles 27 are stationary, that is to say, they do not rotate with the drum yet they are collectively movable to change the degree of inclination thereof to increase or decrease the speed at which material is advanced through the drum.

The baffles or shutters, as they are sometimes called herein, are pivoted at $a$ to a centrally disposed and stationary shaft 28 whose ends are supported by standards 29 adjacent each end of the drum 14. For the purpose of collectively changing the degree of inclination of the baffles 27, a shaft 30 is provided and extends through aligned apertures in the baffles. A protuberance $b$ is mounted on the shaft 30 on each side of each baffle, hence when the extended end of the shaft 30 is moved longitudinally, the baffles are simultaneously displaced on their pivots $a$, thus changing their angularity with respect to the drum or specifically, the material precipitated by the fins of the drum, as described.

In order to heat the material as it is advanced through the drum in the described manner, a pair of burner pipes 31 are disposed above the floor of the housing 12, coextensive with and below the drum 14. Fuel is supplied to the burner 31 from a drum or reservoir 32, pipes 33 and manifold 34. A valve 35 controls the passage of oil through the pipes 33.

Referring again to the drum 14, it will be observed that each end thereof has a large opening A therein. The opening in the front end receives the inlet barrel 15 while the opening A in the opposite end receives the inner end of the discharge or outlet chute 16. The openings A are not of such diameter, however, to permit escape of material from the drum, the flanges embracing the openings being of such width that the drum will retain a substantial quantity of material.

In operation, green hay is harvested as by a conventional mower and then passed through a mill to reduce the same to short lengths, after which this cut material is blown or otherwise deposited into a hopper 36 which communicates with the barrel 15, so called because it houses a flight conveyor 37. This conveyor transports the material into the drum through the opening A in its forward end, which material drops onto the bottom of the drum. As the drum rotates, the longitudinal fins 26 thereof elevate the wet hay, and when these fins reach a position substantially perpendicular to the bottom or slightly before, the material falls by gravity onto the inclined face or faces of the foremost baffles 27, to be returned thereby to the bottom of the drum but in a slightly displaced position. This process is repeated each time the drum revolves, consecutive baffles progressively moving the material towards the rear of the drum but slowly, so that the heated air of the burners 31 will have maximum effect to deprive the material of at least ninety percent of its moisture content. Upon arriving at the rear of the drum, the material is quite dry and during its last cycle of movement, the material is deposited by the rear ends of fins 26 into the chute 16 through which it is delivered into a trailer drawn behind the dehydrator or into sacks, which are closed and placed in the trailer to be thereby transported to storage.

To drive the flight conveyor 37, a chain 38 is driven by a sprocket 39 on the motor shaft 23 and overreaches a sprocket 40 on the shaft of the conveyor 37.

It will be understood that the baffles 27 may be either partly foraminous as provided for by the circular screen section 41, thereof or they may be made up entirely of screen mesh or closely perforated metal. In any case, it is necessary or desirable that they be at least partially pervious to air rising in heated condition from the burner 31 and passing through the drum from the rear to the front thereof and out through opening A in its end and escaping through the flue 42.

Manifestly, the construction as shown and described is capable of some modification and such modification as may be construed to fall within the scope and meaning of the appended claims is also considered to be within the spirit and intent of the invention.

What is claimed is:

1. In a portable machine for drying green hay in the field comprising, in combination, a wheel housing, a drum rotatably disposed in said body and closed except for a material inlet at one end and an outlet at the opposite end, horizontally spaced rollers supporting said drum at each end, a plurality of relatively spaced and partially foraminous baffles within said drum, a shaft extending longitudinally through said drum on which said baffles are adjustably inclined to the vertical, an auger conveyor for admitting wet material into the material inlet of said drum, longitudinal vanes on the inner surface of said drum for elevating said material and depositing the same onto said baffles for progressive movement thereby towards the opposite end of said drum, an oil burner pipe below and coextensive with said drum for heating said drum, means for rotating the rearmost of said drum supporting rollers to rotate said drum and means for discharging dried material from said drum as the same is advanced to said outlet thereof.

2. In a portable hay dehydrating machine, the combination comprising a rotatable drum having a wet material inlet in one end and a dry material outlet at its opposite end, a shaft extending longitudinally through said drum, a plurality of stationary, air pervious baffles within and spaced throughout the length of said drum on said shaft and adjustably inclined to the vertical, said baffles each comprising a circular metallic inner section and an annular outer section of foraminous material for free passage of heated air, vanes affixed longitudinally in the inner surface of said drum for elevating material from the drum for deposit onto said baffles to be progressively displaced thereby towards the outlet of said drum, a rod extending through the inner section of each of said baffles in parallelism with said shaft and capable of longitudinal displacement to change the angle of inclination of said baffles collectively, means for heating said drum from end to end, and means for rotating said drum.

3. In a hay dehydrating machine, the combination comprising a wheeled housing, a rotatable drum in said housing, a shaft disposed longitudinally in said housing, a plurality of air pervious, inclined baffles arranged in spaced relationship within and throughout the length of said drum, each of said baffles comprising a solid metallic disc diametrically pivoted on said shaft, and having an outer foraminous section for the passage of heated air, a rod extending through said discs collectively in parallel relationship with said shaft and capable of longitudinal displacement to effect simultaneous angular movement of said baffles on said shaft, longitudinally disposed vanes on the inner surface of said drum for constantly elevating and depositing onto said baffles material from the bottom of said drum for progressive movement by said baffles towards one end of said drum, means for heating air in said housing, means for constraining said air to move through said drum counter to the direction of travel of said material and means for rotating said drum.

JOHN O. ANDREE.
CHARLES V. PETERSON.

REFERENCES CITED

The following references are of record in the file of this patent:

UNITED STATES PATENTS

| Number | Name | Date |
|---|---|---|
| 501,539 | Scharf | July 18, 1893 |
| 534,491 | Atwood | Feb. 19, 1895 |
| 1,338,731 | Hutchinson | May 4, 1920 |
| 1,629,942 | Zeun | May 24, 1927 |
| 1,873,995 | Corwin | Aug. 30, 1932 |
| 1,988,677 | Arnold | Jan. 22, 1935 |
| 2,033,169 | Zeun | Mar. 10, 1936 |

FOREIGN PATENTS

| Number | Country | Date |
|---|---|---|
| 1,485 | Great Britain | A. D. 1867 |